(12) United States Patent
Bartley et al.

(10) Patent No.: US 9,003,559 B2
(45) Date of Patent: Apr. 7, 2015

(54) CONTINUITY CHECK MONITORING FOR MICROCHIP EXPLOITATION DETECTION

(75) Inventors: Gerald K. Bartley, Rochester, MN (US); Darryl J. Becker, Rochester, MN (US); Paul E. Dahlen, Rochester, MN (US); Philip R. Germann, Oronoco, MN (US); Andrew B. Maki, Rochester, MN (US); Mark O. Maxson, Mantorville, MN (US); Carl-Otto Nilsen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1157 days.

(21) Appl. No.: 12/181,357

(22) Filed: Jul. 29, 2008

(65) Prior Publication Data
US 2010/0031376 A1 Feb. 4, 2010

(51) Int. Cl.
| | |
|---|---|
| G06F 1/26 | (2006.01) |
| G06F 11/00 | (2006.01) |
| G08B 13/00 | (2006.01) |
| G08B 21/00 | (2006.01) |
| G08B 29/00 | (2006.01) |
| G06F 21/87 | (2013.01) |

(52) U.S. Cl.
CPC ...................................... *G06F 21/87* (2013.01)

(58) Field of Classification Search
USPC .............................................. 380/52; 726/34
See application file for complete search history.

(56) References Cited

U.S. PATENT DOCUMENTS

| | | | |
|---|---|---|---|
| 4,146,752 A * | 3/1979 | Konig | ............................ 379/301 |
| 4,288,829 A | 9/1981 | Tango | |
| 5,117,457 A | 5/1992 | Comerford et al. | |
| 5,177,352 A | 1/1993 | Carson et al. | |
| 5,389,738 A | 2/1995 | Piosenka et al. | |
| 5,675,319 A | 10/1997 | Rivenberg et al. | |
| 5,721,727 A | 2/1998 | Ashi et al. | |
| 5,790,670 A * | 8/1998 | Bramlett | ........................... 380/52 |
| 5,861,652 A | 1/1999 | Cole et al. | |
| 5,889,306 A | 3/1999 | Christensen et al. | |
| 6,121,659 A | 9/2000 | Christensen et al. | |
| 6,264,108 B1 | 7/2001 | Baentsch | |
| 6,396,400 B1 | 5/2002 | Epstein, III et al. | |
| 7,005,733 B2 | 2/2006 | Kommerling et al. | |

(Continued)

OTHER PUBLICATIONS

Ramkumar Chinchani; A Tamper-Resistant Framework for Unambiguous Detection of Attacks in User Space Using Process Monitors; Year: 2003; IEEE; p. 1-10.*

(Continued)

*Primary Examiner* — Mohammad W Reza
*Assistant Examiner* — Monjour Rahim
(74) *Attorney, Agent, or Firm* — Toler Law Group

(57) ABSTRACT

Apparatus, method and program product detect an attempt to tamper with a microchip by determining that an electrical path comprising one or more connections and a metal plate attached to the backside of a microchip has become disconnected or otherwise altered. A tampering attempt may also be detected in response to the presence of an electrical path that should not be present, as may result from the microchip being incorrectly reconstituted. Actual and/or deceptive paths may be automatically selected and monitored to further confound a reverse engineering attempt.

18 Claims, 5 Drawing Sheets

(56) References Cited

U.S. PATENT DOCUMENTS

| | | |
|---|---|---|
| 7,362,248 B2 | 4/2008 | McClure et al. |
| 7,555,787 B2 | 6/2009 | Clercq |
| 7,952,478 B2 | 5/2011 | Bartley et al. |
| 8,172,140 B2 | 5/2012 | Bartley et al. |
| 8,214,657 B2 | 7/2012 | Bartley et al. |
| 8,332,659 B2 | 12/2012 | Bartley et al. |
| 2001/0033012 A1* | 10/2001 | Kommerling et al. ........ 257/679 |
| 2002/0002683 A1 | 1/2002 | Benson et al. |
| 2002/0007459 A1* | 1/2002 | Cassista et al. ............... 713/200 |
| 2002/0104872 A1* | 8/2002 | DeFelice et al. ............. 228/103 |
| 2002/0112213 A1* | 8/2002 | Abadir et al. ...................... 716/4 |
| 2002/0199111 A1 | 12/2002 | Clark et al. |
| 2005/0151777 A1* | 7/2005 | Silverbrook ..................... 347/19 |
| 2005/0218401 A1 | 10/2005 | Marinet et al. |
| 2005/0274630 A1 | 12/2005 | Clark et al. |
| 2005/0275538 A1 | 12/2005 | Kulpa |
| 2006/0028340 A1 | 2/2006 | Hooghan et al. |
| 2006/0081497 A1 | 4/2006 | Knudsen |
| 2006/0157803 A1* | 7/2006 | Chow et al. .................... 257/399 |
| 2007/0029384 A1 | 2/2007 | Atherton |
| 2008/0000988 A1 | 1/2008 | Farooq et al. |
| 2008/0251906 A1* | 10/2008 | Eaton et al. .................... 257/686 |
| 2008/0258754 A1* | 10/2008 | Dillon et al. ........................ 326/8 |
| 2008/0260150 A1 | 10/2008 | De Clercq |
| 2009/0126030 A1 | 5/2009 | Walmsley |
| 2009/0146270 A1 | 6/2009 | Buer et al. |
| 2010/0026313 A1 | 2/2010 | Bartley et al. |
| 2010/0026506 A1 | 2/2010 | Bartley et al. |
| 2010/0031064 A1 | 2/2010 | Walmsley |
| 2010/0090714 A1 | 4/2010 | Van Geloven et al. |

OTHER PUBLICATIONS

U.S. Appl. No. 12/181,342, Notice of Allowance dated Jan. 26, 2011, (12 pgs).

Berrie, The Practical Engineer—The defensive design of printed-circuit boards, Sep. 1999, IEEE Spectrum, vol. 36, Issue 9, (pp. 76-81).

U.S. Appl. No. 12/181,387, Non-Final Office Action dated Feb. 28, 2011, (9 pgs).

U.S. Appl. No. 12/181,401, Non-Final Office Action dated Aug. 3, 2011, (12 pgs).

U.S. Appl. No. 12/181,387, Final Office Action dated Aug. 15, 2011, (10 pgs).

U.S. Appl. No. 12/181,342, Non-Final Office Action dated Jul. 7, 2010, 8 pages.

U.S. Appl. No. 12/181,352, Non-Final Office Action dated Jan. 20, 2011, 7 pages.

U.S. Appl. No. 12/181,352, Final Office Action dated Jul. 6, 2011, 10 pages.

U.S. Appl. No. 12/181,352, Non-Final Office Action dated Nov. 28, 2011, 9 pages.

U.S. Appl. No. 12/181,352, Notice of Allowance Action dated Aug. 2, 2012, 9 pages.

U.S. Appl. No. 12/181,387, Notice of Allowance dated Feb. 22, 2012, 7 pages.

U.S. Appl. No. 12/181,401, Notice of Allowance dated Jan. 5, 2012, 8 pages.

\* cited by examiner

CONTINUITY CHECK MONITORING FOR MICROCHIP EXPLOITATION DETECTION

RELATED APPLICATIONS

The present application relates to co-pending U.S. patent applications entitled "Capacitance-Based Microchip Exploitation Detection" (U.S. application Ser. No. 12/181,342), "Signal Quality Monitoring to Defeat Microchip Exploitation" U.S. application Ser. No. 12/181,352), "False Connection for Defeating Microchip Exploitation" (U.S. Pat. No. 7,701,244), "Interdependent Microchip Functionality for Defeating Exploitation Attempts" (U.S. application Ser. No. 12/181,376), "Capacitance Structures for Defeating Microchip Tampering" (U.S. Pat. No. 7,884,625), "Resistance Sensing for Defeating Microchip Exploitation" (U.S. application Ser. No. 12/181,387), and "Doped Implant Monitoring for Microchip Tamper Detection" (U.S. application Ser. No. 12/181,401), all of which are filed concurrently herewith and which are incorporated by reference in their entireties.

FIELD OF THE INVENTION

The present invention relates generally to microchip technologies, and more particularly, to protecting the circuitry and content of microchips.

BACKGROUND OF THE INVENTION

Protecting microchip technology deployed in the field is an enormous concern in both military and commercial sectors. Microchips and related devices are routinely acquired by motivated competitors and governments seeking to reverse engineer or otherwise learn the functionality of the technology. Such information is used to make a technological leap in their own devices, or may be used to exploit a perceived weakness in the examined equipment. Sophisticated government and commercial entities thus possess ample strategic and economic motivation to reverse engineer microchip components.

A microchip, or integrated circuit, is a unit of packaged computer circuitry that is manufactured from a material, such as silicon, at a very small scale. Microchips are made for program logic (logic or microprocessors) and for computer memory (Random Access Memory or other memory microchips). Microchips are also made that include both logic and memory, and for special purposes, such as analog-to-digital conversion, bit slicing and gateways.

An advanced method of reverse engineering select microchip components uses high energy photons, electrons or ions. Focused ion beam processes excite active portions of a microchip to observe how other portions are affected. When used to reverse engineer, these processes are typically done while the microchip is in a powered-on state in order to observe the functionality of the microchip.

Microchip designers in the aerospace, defense and commercial industries routinely implement software and other logic-related techniques to confuse and thwart attempts to probe the active side of the component. For example, safeguard measures integrated within microchips hinder reverse engineering techniques. Microchip designers capitalize on the powered on status required by a reverse engineering process to incorporate a self-destruct or obstructing mechanism into the microchip. The mechanism is triggered by the detection of tampering. When tampering is detected, the power in the circuit is diverted to microchip annihilation or another predetermined measure.

Microchip designers sometimes impede the reverse engineering processes by additionally plating the back of the bulk silicon with a metal layer. While intact, this layer obstructs both the insertion of ions and electrons, and the observation of photons.

While these safeguards provide some protection, motivated exploiters have developed ingenious ways of analyzing the microchip without triggering the safeguard mechanisms. Despite the precautions, the backside of the microchip remains vulnerable to inspection by photons, focused ion beam, or even simple infrared observation. Sophisticated exploitation techniques overcome conventional obstacles by removing the bulk silicon and metallized back layer. For instance, reverse engineering processes may grind away the metallized portion towards implementing a successful focused ion beam operation. In this manner, microchip information may be exploited in a manner that does not initialize a self-destruct feature.

Consequently what is needed is an improved manner of detecting tampering of a microchip.

SUMMARY OF THE INVENTION

The present invention provides an improved computer implemented method, apparatus and program product for interfering with a microchip tampering effort by providing, in part, an electrical path proximate security sensitive circuitry of a microchip, the electrical path comprising a conductive element in electrical communication with a plurality of connections. Circuitry in electrical communication with the electrical path may be configured to initiate an action for obstructing analysis of the security sensitive circuitry in response to a detected alteration of the electrical path. Electrical communication may include a physical connection, a sequence of physical and/or remote connections, or merely a proximity within which an electrical property may be detected.

In one embodiment consistent with the invention, the conductive element may comprise a metallic plate positioned on the backside of the microchip. The circuitry may be further configured to detect the alteration of the electrical path. The circuitry may detect the alteration by detecting an interruption in the electrical path.

In one aspect of the invention, the plurality of connections may be automatically selected for inclusion within the electrical path. The connections may also be randomly selected for inclusion within the electrical path. The connections may comprise through-silicon vias. Embodiments consistent with the invention may include a signal transmitter configured to transmit a signal to the electrical path, and a signal receiver configured to receive a signal from the electrical path.

Another aspect of the invention may include another connection unconnected to the electrical path. The other connection may appear to be connected to the electrical path. The circuitry may be further configured to initiate the action for obstructing the analysis of the security sensitive circuitry in response to the other connection being connected to the conductive element.

Embodiments consistent with the underlying principles of the present invention may be automatically selected from among a plurality of electrical paths. A bus may facilitate the automatic selection of the electrical path. According to another aspect of the invention, program code may be executed by the circuitry and configured to initiate the action for obstructing analysis of the security sensitive circuitry in response to the detected interruption in the performance of the function. A computer readable medium may bear the program code.

Another aspect of the invention may include an electrical path comprising a plurality of connections connected to a conductive element and configured to communicate an electronic signature, wherein the disconnection of an electrical path of the plurality causes a change in the electronic signature.

An embodiment consistent with the invention may further include a false path comprising a plurality of other connections connected to the conductive element, wherein the electronic signature is unaffected when the false path is unconnected. Circuitry in electrical communication with the electrical path may be configured to initiate an action for obstructing analysis of security sensitive circuitry of a microchip in response to a detected alteration of the electrical signature. The circuitry may further be configured to initiate the action in response to the false path affecting the electrical signature.

According to another aspect of the invention, security sensitive circuitry of a microchip may be protected from undesired analysis by, in part, detecting an alteration of an electrical path comprising a plurality of conductive elements in electrical communication with a conductive element, and initiating an action for obstructing analysis of the security sensitive circuitry in response to the detected alteration of the electrical path.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Figure 1:
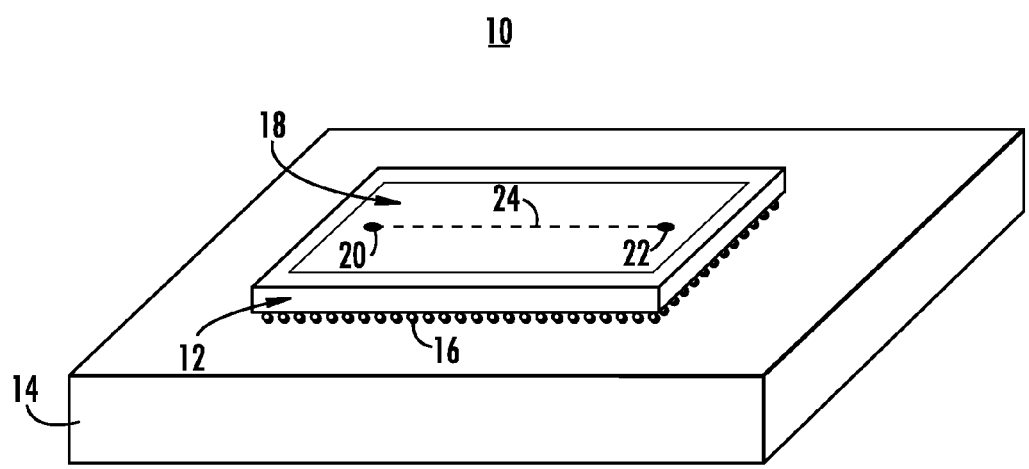
FIG. 1 shows an integrated circuit assembly that includes an electrical path used to verify the security and integrity of a microchip in accordance with the underlying principles of the invention.

Embodiments consistent with the underlying principles of the present invention may detect an attempt to tamper with a microchip by determining that an electrical path comprising one or more connections and a metal plate attached to the backside of a microchip has become disconnected or otherwise altered. A tampering attempt may also be detected in response to the presence of an electrical path that should not be present, as may result from the microchip being incorrectly reconstituted. Actual and/or deceptive paths may be automatically selected and monitored to further confound a reverse engineering attempt.

Embodiments include mechanisms useful for identifying an exploitation event, and in response, initiating a defensive action for obstructing the effort and protecting security sensitive circuitry. Aspects of the invention include a metal plate attached to the backside of the microchip. The plate, or conductive element, may connect to a plurality of through-silicon vias or other connections used to comprise a continuity sensing apparatus.

Embodiments consistent with the invention may include a static continuity sensing structure. By connecting multiple through-silicon vias to multiple locations of a metalized plate attached to the backside of the bulk silicon of the microchip, a continuity sensing circuit may detect if appropriate contact is being made. If not, then a defensive action, not limited to a shutdown, spoofing and/or self-destruct operation may be accomplished.

In one embodiment, electrical continuity may be accomplished with a simple pair of through-silicon vias in connection with the metalized plate on the backside of the microchip. In another or the same embodiment, electrical continuity is achieved with multiple through-silicon vias randomly or otherwise selectively connected to the metalized plate on the backside of the microchip.

As such, a conductive element comprising the metalized plate may be connected to circuitry in the microchip for sensing a tampering event. One exemplary sensing process may include a basic continuity check.

Sensing circuitry may be designed to connect to predetermined paths and may verify the proper connection to the metalized plate or other conductive element. Such a circuit may sense the connection to the metalized plate for the purpose of making a decision to initiate the desired action when tampering occurs. Additionally, unconnected, deceptive through-silicon vias may otherwise appear to be like other vias of the sensing circuitry. These unconnected, false through-silicon vias may nonetheless appear to be connected to the metal plate or other conductive element, which further complicates a reverse engineering process.

In one embodiment, a pair of through-silicon vias may comprise a connection to the metalized plate on the backside of the microchip. One skilled in the art, however, will appreciate that other connections may be used in a manner consistent with the underlying principles of the present invention. An exemplary detection circuit may sense when paths between through-silicon connections have been altered. In one detection example, an out node may switch to high when one or more paths become open.

In another or the same embodiment, paths may be randomized. Such action may be accomplished at power-on, for instance, further complicating a reverse engineering process. Where desired, multiple false/dummy paths are intended to be open. Their presence may further obfuscate the required path connections that allow the microchip to operate. In addition, the false path connections may be randomly determined at power-on to obstruct microchip exploitation.

FIG. 1 shows an integrated circuit assembly 10 that includes an electrical path 24 used to verify the security and integrity of a microchip 12. The microchip mounts onto a microchip carrier 14 using die bumps 16. The microchip carrier 14 generally comprises the package in which the microchip 12 is mounted for plugging into (socket mount) or soldering onto (surface mount) a printed circuit board. As shown in FIG. 1, the assembly 10 includes a conduction element 18. The conductive element 18 may comprise a copper plate. Multiple connections 20, 22 may connect to the conductive element 18. The connections 20, 22 may also comprise a portion of the electrical path 24, which connects the connections 20, 22 to each other. Exemplary connections 20, 22 may include a through-silicon or other via. A through-silicon via is a type of via that generally comprises a vertical electrical connection passing through a silicon wafer or die for the purpose of creating three-dimensional packages and circuits.

A detected interruption in the electrical path 24 may indicate that the integrated circuit assembly 10 has been altered, such as may result during an exploitation process. Circuitry associated with the microchip 12 may accordingly initiate defensive processes intended to impede reverse engineering efforts.

In one sense, the assembly embodiment of FIG. 1 includes a flip chip integrated circuit structure. Flip chip mounting typically uses die bumps 16, e.g., solder, instead of wire bonds. The die bumps 16 are deposited on the microchip pads, which are located on the top side of the wafer during the final wafer processing step. In order to mount the microchip 12 to external circuitry (on a circuit board or another wafer or a microchip), the microchip is flipped over so that the topside faces toward the mounting area. The die bumps 16 are used to connect directly to the associated external circuitry. Other embodiments consistent with the invention may include wire-bond connections and associated processes.

Figure 2:
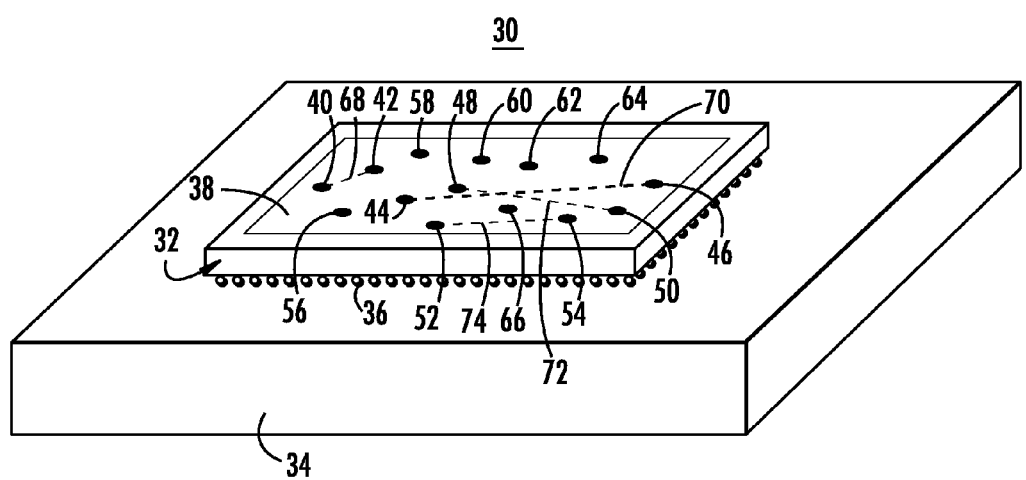
FIG. 2 shows an integrated circuit assembly that includes actual and false electrical paths used for verifying the integrity of a microchip against a reverse engineering effort in accordance with the underlying principles of the invention.

FIG. 2 shows an integrated circuit assembly 30 that includes actual and false electrical paths used for verifying the integrity of a microchip 32 against a reverse engineering effort. The microchip 32 mounts or is otherwise attached to a microchip package 34 using die bumps 36.

The microchip 32 may include or be otherwise attached to a conductive element 38. While shown as a metallic plate in FIG. 2, the conductive element of another embodiment may include a wire or other conductive shape.

In one embodiment, the conductive element 38 may be in electrical communication with a plurality of connections 40, 42, 44, 46, 48, 50, 52, 54, 56, 58, 60, 62, 64 and 66. As designated by dashed lines 68, 70, 72, and 74, a number of the connections may be connected to one another by electrical paths. Namely, connections 40 and 42 are shown as being connected by an electrical path 68. Connections 44 and 46 may be connected by electrical path 70. Connections 48 and 50 are shown as connected by electrical path 72. Finally, the electrical path 74 may connect connections 52 and 54. One or more of these paths may selectively comprise an electrical path used to verify the integrity of the integrated circuit assembly 30.

Other connections 56, 58, 60, 62, 64 and 66 may connect to electrical paths, the existence of which should not affirm the integrity of the microchip 32. As shown in FIG. 2, there may be no actual connection between the numbers of these connections 56, 58, 60, 62, 64. Where so configured, a clearance land or other physical structure may prevent electrical communication between such connections 56, 58, 60, 62, 64 and the conductive element 38. Such an obstructing structure may go unnoticed during an exploitation attempt, confusing the analysis.

During a reverse engineering effort, an exploitation team may become confused as to which connections should actually be connected using an electrical path, and which, if any, should be unconnected. A failure to reconnect connections 44, 46 that should be connected, or connecting false connections 52, 54 that should not be connected at a given point in time (as automatically designated by the software), may result in the initiation of a defensive action configured to obscure the reverse engineering process.

Figure 3:
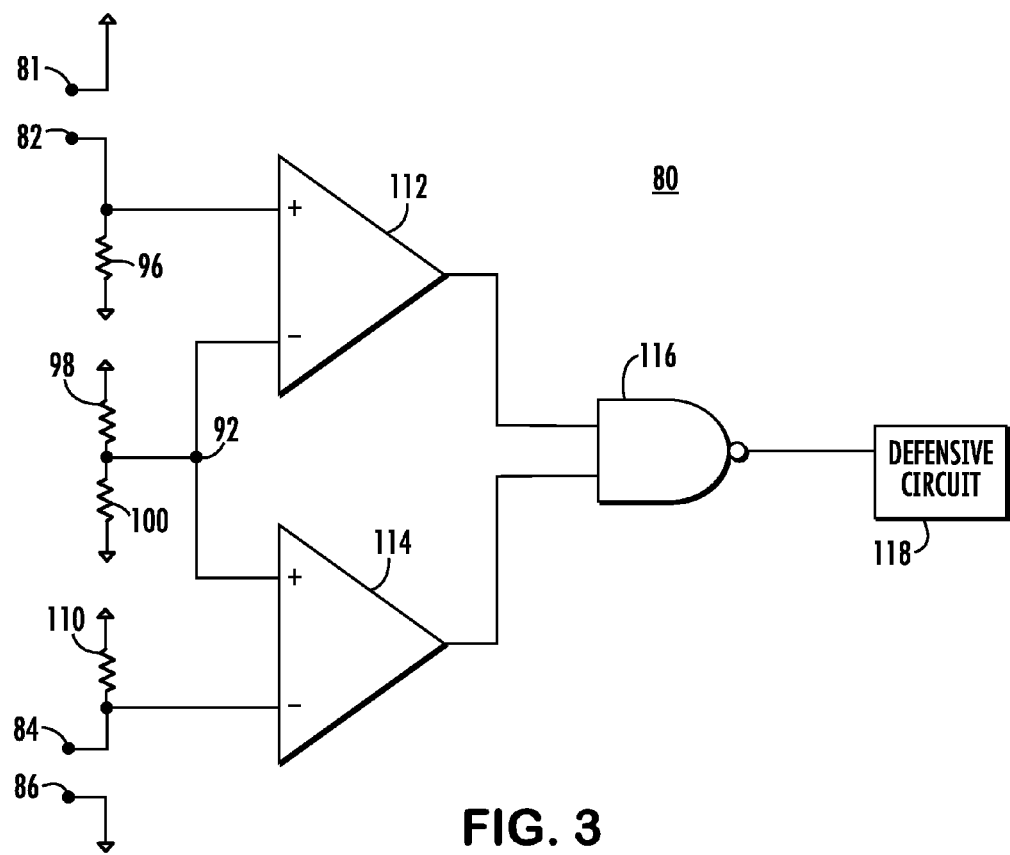
FIG. 3 shows a detection circuit configured to sense an electrical path as might have application with the assembly of FIG. 1.

FIG. 3 shows a detection and defensive circuit 80 configured to sense an electrical path as might have application with the assembly 10 of FIG. 1. The detection and defensive circuit 80 may include input points 81, 82, 84 and 86 that may correspond to vias or other connections 20, 22. Voltage may be present at such connections 20, 22 when an electrical pulse propagates through an associated electrical path 24. The detected voltage may be input from the nodes 82, 84 to inputs of respective comparators 112, 114. Other inputs to the comparators 112, 114 may include an input from a voltage divider comprising resistors 98, 100 fed from node 92. A comparator typically compares two voltages or currents and switches its output to indicate which is larger.

The outputs from the comparators 112, 114 may be fed into a NAND gate 116. The NAND gate 116 may output a signal to a defensive circuit 118 at any point at which both of the comparators 112, 114 do not output a signal. Such may be the case where there is no expected voltage (and associated electrical path) at either node 82 or 84.

Configured as such, the comparators 112, 114 may respectively output a signal anytime insufficient voltage is present at input nodes 82 and 84. Such voltage should be present at the nodes 82, 84 when electrical paths associated with the nodes 82, 84 are active and intact. Alternatively, either of the comparators 112, 114 may output a "0", or no output, where insufficient voltage is present at nodes 82, 84. Such insufficient voltage may indicate that there is no electrical path connection at the nodes 82, 84. As such, the detection and defensive circuit 80 may be configured to sense when either of the two electrical paths that include nodes 82 and 84 are unconnected.

Figure 4:
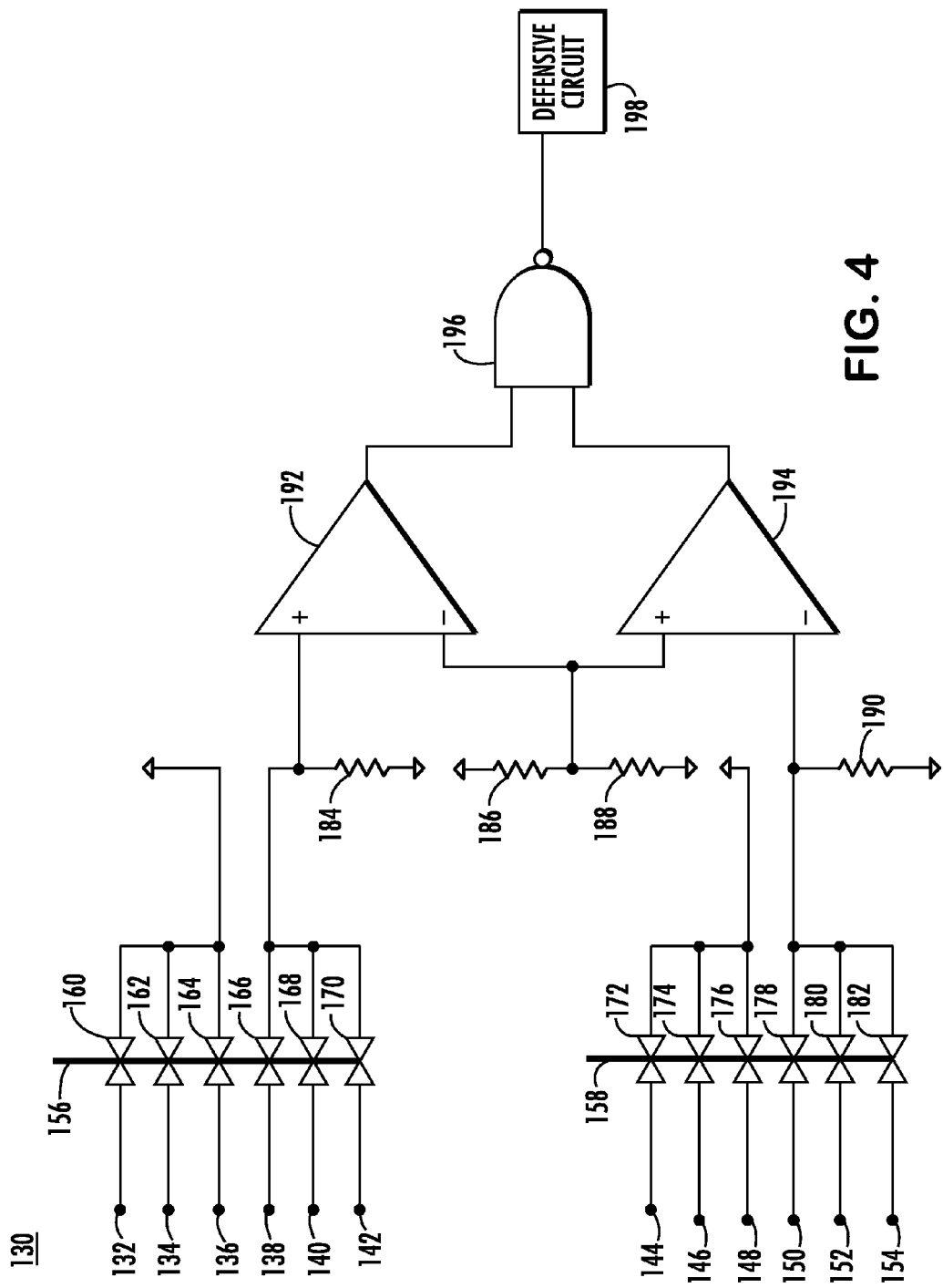
FIG. 4 shows a detection and defensive circuit configured to detect tampering of one of a plurality of intended and false electrical paths for the purpose of defeating a reverse engineering attempt involving an integrated circuit assembly such as is shown in FIG. 2.

FIG. 4 shows a detection and defensive circuit 130 configured to detect tampering of one of a plurality of intended and false electrical paths for the purpose of defeating a reverse engineering attempt on an integrated circuit assembly 30, such as is shown in FIG. 2. Turning more particularly to FIG. 4, the circuit 130 includes a number of input nodes 132, 134, 136, 138, 140, 142, 144, 146, 148, 150, 152 and 154 corresponding to vias or other connections 40, 42, 44, 46, 48, 50, 52, 54, 56, 58, 60, 62, 64 and 66. More particularly, input nodes 132, 134, 136, 138, 140 and 142 may correspond to connections 40, 42, 44, 46, 48, 50, 52 and 54 that comprise part of electrical paths that may be selected for use in verifying actual conductivity.

The input nodes 132, 134, 136, 138, 140 and 142 may connect to a bus 156 and associated selection logic (not shown). The nodes 132, 134, 136, 138, 140, 142 may more specifically communicate the bus 156 using multiplexers 160, 162, 164, 166, 168, 170. As such, one or more of the voltages present at nodes 132, 134, 136, 138, 140, 142 may be selectively input to a comparator 192. The comparator 192 may also receive an input from a voltage divider circuit comprising resistors 186, 188. The values of the resistors 186, 188 may be automatically configured according to which electrical paths and associated nodes 132, 134, 136, 138, 140, 142 are selected using the bus 156. As such, the comparator 192 may output a binary signal where an expected voltage from one or more of the nodes 132, 134, 136, 138, 140, 142 is greater than that computed by the voltage divider and resistors 186, 188.

If the voltage of the comparator 112 and the positive input terminal is larger than the voltage at its negative input terminal, the comparator 112 may output a high signal, "1". When the positive input port of the comparator 112 is smaller than the negative input port, the output of the comparator 112 may be "0", or no output.

The comparator 192 may output a signal when the voltage arriving at its positive input port is greater than the voltage present at its negative input port. That voltage may be determined by the voltage divider circuit comprising resisters 186, 188.

The circuit 130 of FIG. 4 also includes a number of via connections 144, 146, 148, 150, 152, 154 that do not form part of an expected or designed electrical path and associated electronic signature. The connections 144, 146, 148, 150, 152, 154 may connect to a control bus 158 and multiplexers 172, 174, 176, 178, 180, 182. The presence of a voltage at the input port of the comparator 194 may prompt the comparator 194 to output a zero. The arrival of a one and a zero at the NAND gate 116 may cause the NAND gate 116 to output a signal to the defensive circuit 198.

Figure 5:
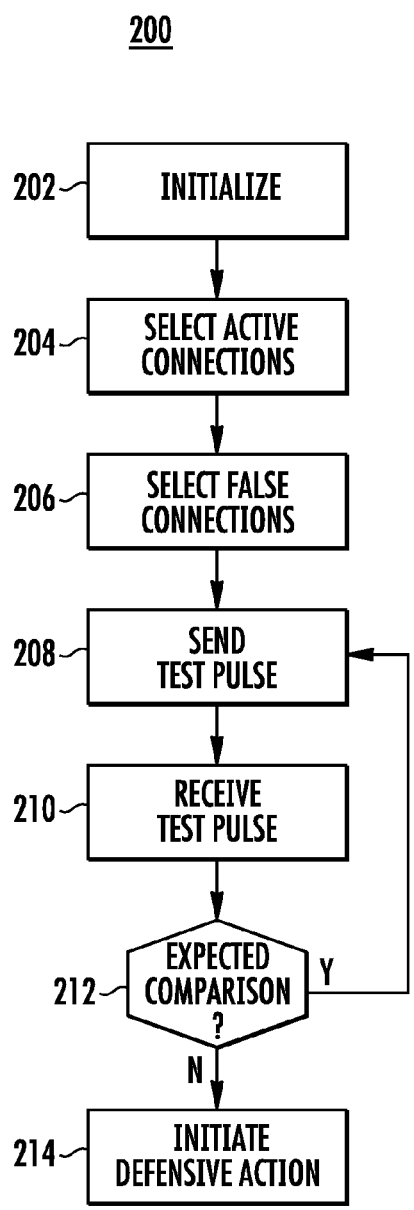
FIG. 5 shows a flowchart having steps executable by the integrated circuit assembly of FIG. 2 for detecting and obscuring a reverse engineering effort.

The flowchart 200 of FIG. 5 includes steps executable by the microchip 32 of FIG. 2 for detecting and obscuring a reverse engineering effort. At block 202 of FIG. 5, the detection and/or defensive circuits of the microchip 32 may initialize. Active electrical paths 68, 70, 72 and 74 may be selected at block 204. Alternatively or additionally, the microchip 32 may automatically select false connections at block 206 of FIG. 5. As discussed herein, the unpredictable inclusion and selective actual and false paths may complicate an exploitation effort.

A test pulse may be sent at block 208. Voltage or current associated with the test pulse may be detected at block 210. At block 212, an embodiment may determine if the detected electrical parameter was expected. If so, then the microchip 32 may continue to monitor for tampering. Alternatively, detection processes of another embodiment may be initiated only in response to tampering, i.e., where a voltage level is tripped by the removal of a path.

Where the expected voltage is not detected at block 212, then the microchip 12 may initiate at block 214 a defensive action intended to defeat the presumed exploitation of the integrated circuit assembly 30. Exemplary defensive actions are not limited to shutdown, spoofing and self-destruct operations.

While the invention has and hereinafter will be described in the context of integrated circuit assemblies, those skilled in the art will appreciate that the various embodiments of the invention are capable of being distributed as a program product in a variety of forms, and that the invention applies equally regardless of the particular type of computer readable, signal bearing media used to actually carry out the distribution. For instance, a separate processor incorporated within or otherwise in communication with an integrated circuit assembly may access memory to execute program code functions to identify tampering in a software manner that is consistent with the underlying principles of the present invention. Examples of signal bearing, computer readable media include, but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In general, the routines executed to implement the embodiments of the invention, whether implemented in hardware, as part of an integrated circuit assembly, or as a specific application, component, program, engine, process, programmatic tool, object, module or sequence of instructions, or even a subset thereof, may be referred to herein as an "algorithm," "function," "program code," or simply "program." Program code typically comprises one or more instructions that are resident at various times in various memory and storage devices in a computing system. When read and executed by one or more processors, the program code performs the steps necessary to execute steps or elements embodying the various aspects of the invention. One of skill in the art should appreciate that embodiments consistent with the principles of the present invention may nonetheless use program code resident at only one or any number of locations.

Those skilled in the art will further recognize that the exemplary environments illustrated in FIGS. 1-5 are not intended to limit the present invention. For instance, while flip chip mounting processes are used in many of the embodiments above for exemplary purposes, embodiments of the invention may have equal applicability to microchip assemblies associated with virtually any other mounting technique. Indeed, those skilled in the art will recognize that other alternative hardware and/or software environments may be used without departing from the scope of the invention.

Moreover, while the present invention has been illustrated by a description of various embodiments and while these embodiments have been described in considerable detail, it is not the intention of the Applicants to restrict, or in any way limit the scope of the appended claims to such detail. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. An apparatus comprising:
an electrical path configured to electrically connect a plurality of first connections, wherein the plurality of first connections are first connecting points in first circuitry of a microchip, and wherein the electrical path comprises a conductive element;
a false electrical path configured to appear to connect a plurality of second connections but not electrically connecting the plurality of second connections, wherein the plurality of second connections are second connecting points in the first circuitry of the microchip; and
second circuitry configured to detect a disconnection of the electrical path, a connection of the false electrical path, or a combination thereof resulting from a reverse engineering process targeting the first circuitry, and to initiate an action to obstruct the reverse engineering process, wherein the second circuitry is in electrical communication with the electrical path and with the false electrical path, and wherein the second circuitry is embedded with the first circuitry.

2. The apparatus of claim 1, wherein the conductive element comprises a metallic plate.

3. The apparatus of claim 1, wherein the conductive element is positioned on a backside of the microchip.

4. The apparatus of claim 1, wherein the plurality of first connections are selected automatically, randomly, or a combination thereof for inclusion within the electrical path.

5. The apparatus of claim 1, wherein the plurality of second connections are selected automatically, randomly, or a combination thereof for inclusion within the false electrical path.

6. The apparatus of claim 1, wherein the plurality of first connections and the plurality of second connections include through-silicon vias.

7. The apparatus of claim 1, further comprising a signal transmitter configured to transmit a signal to the electrical path.

8. The apparatus of claim 1, further comprising a signal receiver configured to receive a signal from the electrical path.

9. The apparatus of claim 1, further comprising a bus configured to facilitate automatic selection, random selection, or a combination thereof of first connections for inclusion within the electrical path.

10. The apparatus of claim 1, further comprising a bus configured to facilitate automatic selection, random selection, or a combination thereof of second connections for inclusion within the false electrical path.

11. The apparatus of claim 1, further comprising program code executed by the second circuitry and configured to initiate the action for obstructing the reverse engineering process, and a computer readable storage device storing the program code.

12. The apparatus of claim 1, wherein the action includes a shutdown operation, a spoofing operation, a self-destruct operation, or any combination thereof.

13. An apparatus comprising:
a false electrical path configured to appear to connect a plurality of connections but not electrically connecting the plurality of connections, wherein the plurality of connections are connecting points in first circuitry of a microchip; and
second circuitry configured to detect a connection of the false electrical path resulting from a reverse engineering process targeting the first circuitry and to initiate an action to obstruct the reverse engineering process, wherein the second circuitry is in electrical communication with the false electrical path, and wherein the second circuitry is embedded with the first circuitry.

14. A method of protecting security sensitive circuitry of a microchip from undesired analysis, the method comprising:
initializing the microchip;
selecting an electrical path from among a plurality of electrical paths, wherein the electrical path is configured to electrically connect a plurality of first connections, and wherein the plurality of first connections are connecting points in first circuitry of the microchip;
selecting a false electrical path from among a plurality of false electrical paths, wherein the false electrical path is configured to appear to connect a plurality of second connections but to not electrically connect the plurality of second connections, and wherein the plurality of second connections are second connecting points in the first circuitry of the microchip;
detecting, by second circuitry, a disconnection of the electrical path, a connection of the false electrical path, or a combination thereof resulting from a reverse engineering process targeting the first circuitry, wherein the second circuitry is in electrical communication with the electrical path and with the false electrical path; and
initiating an action to obstruct the reverse engineering process, wherein the second circuitry is embedded with the first circuitry.

15. The apparatus of claim 1, wherein the second circuitry comprises:
a plurality of comparators;
a NAND gate; and
a defensive circuit,
wherein the plurality of comparators are configured to compare input signals from the plurality of first connections of the electrical path and the plurality of second connections of the false electrical path with reference signals and to output results to the NAND gate,
wherein the NAND gate is configured to output a signal to the defensive circuit in response to the results from the plurality of comparators, and
wherein the defensive circuit is configured to initiate the action to obstruct the reverse engineering process when the signal from the NAND gate indicates the disconnection of the electrical path, the connection of the false electrical path, or a combination thereof.

16. The apparatus of claim 13, wherein the second circuitry comprises:
a plurality of comparators;
a NAND gate; and
a defensive circuit,
wherein the plurality of comparators are configured to compare input signals from the plurality of connections of the false electrical path with reference signals and to output results to the NAND gate,
wherein the NAND gate is configured to output a signal to the defensive circuit in response to the results from the plurality of comparators, and
wherein the defensive circuit is configured to initiate the action to obstruct the reverse engineering process when the signal from the NAND gate indicates the connection of the false electrical path.

17. The method of claim 14, wherein the second circuitry comprises:
a plurality of comparators;
a NAND gate; and
a defensive circuit,
wherein the plurality of comparators are configured to compare input signals from the plurality of connections of the electrical path and the plurality of second connections of the false electrical path with reference signals and to output results to the NAND gate,
wherein the NAND gate is configured to output a signal to the defensive circuit in response to the results from the plurality of comparators, and
wherein the defensive circuit is configured to initiate the action to obstruct the reverse engineering process when the signal from the NAND gate indicates the disconnection of the electrical path, the connection of the false electrical path, or a combination thereof.

18. The apparatus of claim 13, wherein the plurality of connections are selected automatically, randomly, or a combination thereof for inclusion within the false electrical path, and wherein the plurality of connections include through-silicon vias.

* * * * *